(12) United States Patent
Shimoda et al.

(10) Patent No.: US 8,846,152 B2
(45) Date of Patent: Sep. 30, 2014

(54) ANTIOXIDANT AGENT AND PROCESS FOR PRODUCING METALLIC MATERIAL

(75) Inventors: Kazuhiro Shimoda, Nishinomiya (JP); Tomio Yamakawa, Kawanishi (JP); Koji Muramatsu, Takatsuki (JP); Yuji Inoue, Amagasaki (JP); Junichi Nishimori, Kobe (JP); Yasuyoshi Hidaka, Kobe (JP); Keishi Matsumoto, Takarazuka (JP); Takahisa Kato, Tokai (JP); Shuichi Akiyama, Obu (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/810,104

(22) PCT Filed: Jul. 13, 2011

(86) PCT No.: PCT/JP2011/066008
§ 371 (c)(1),
(2), (4) Date: Jan. 14, 2013

(87) PCT Pub. No.: WO2012/008501
PCT Pub. Date: Jan. 19, 2012

(65) Prior Publication Data
US 2013/0115376 A1 May 9, 2013

(30) Foreign Application Priority Data
Jul. 16, 2010 (JP) .................. 2010-162159

(51) Int. Cl.
| | | |
|---|---|---|
| *B05D 3/02* | (2006.01) | |
| *C09K 15/02* | (2006.01) | |
| *C03C 8/14* | (2006.01) | |
| *C03C 8/16* | (2006.01) | |
| *C03C 8/22* | (2006.01) | |
| *C21D 1/70* | (2006.01) | |
| *C21D 8/02* | (2006.01) | |
| *C21C 7/06* | (2006.01) | |
| *C23C 24/10* | (2006.01) | |
| *C03C 3/087* | (2006.01) | |
| *C03C 3/093* | (2006.01) | |
| *C03C 8/02* | (2006.01) | |
| *C03C 8/04* | (2006.01) | |

(52) U.S. Cl.
CPC . *C09K 15/02* (2013.01); *B05D 3/02* (2013.01); *C03C 8/14* (2013.01); *C03C 8/16* (2013.01); *C03C 8/22* (2013.01); *C21D 1/70* (2013.01); *C21D 8/0226* (2013.01); *C21D 8/0284* (2013.01); *C21C 7/06* (2013.01); *C23C 24/10* (2013.01); *C03C 3/087* (2013.01); *C03C 3/093* (2013.01); *C03C 8/02* (2013.01); *C03C 8/04* (2013.01)
USPC ........................................................ 427/372.2

(58) Field of Classification Search
None
See application file for complete search history.

(56) References Cited

U.S. PATENT DOCUMENTS

| | | | | |
|---|---|---|---|---|
| 4,084,975 A | * | 4/1978 | Faust .................... | 501/16 |
| 4,732,794 A | * | 3/1988 | Hyde ..................... | 428/210 |
| 5,439,852 A | * | 8/1995 | Hormadaly ............ | 501/26 |
| 5,691,282 A | * | 11/1997 | Periard et al. ......... | 508/113 |
| 6,001,494 A | * | 12/1999 | Kuchinski et al. ..... | 428/653 |
| 2003/0082306 A1 | * | 5/2003 | Waters et al. .......... | 427/376.2 |
| 2003/0186799 A1 | * | 10/2003 | Beyrle ................... | 501/14 |
| 2004/0029700 A1 | * | 2/2004 | Kato et al. ............. | 501/16 |
| 2007/0290590 A1 | * | 12/2007 | Hoffman ................ | 313/141 |
| 2008/0026320 A1 | * | 1/2008 | Lee et al. ............... | 430/270.1 |
| 2009/0186187 A1 | * | 7/2009 | Lee et al. ............... | 428/116 |
| 2009/0301151 A1 | * | 12/2009 | Shimoda et al. ....... | 72/42 |
| 2010/0126565 A1 | * | 5/2010 | Takeda et al. .......... | 136/252 |
| 2010/0330308 A1 | * | 12/2010 | Cooper et al. ......... | 428/34 |
| 2012/0171810 A1 | * | 7/2012 | Park et al. .............. | 438/98 |

FOREIGN PATENT DOCUMENTS

| | | |
|---|---|---|
| JP | 48-017460 | 3/1973 |
| JP | 01-224239 | 9/1989 |
| JP | 06-504302 | 5/1994 |
| JP | 2002-356787 | 12/2002 |

| | | |
|---|---|---|
| JP | 2007-314780 | 12/2007 |
| JP | 2007-314875 | 12/2007 |
| WO | 2007/122972 | 11/2007 |

\* cited by examiner

*Primary Examiner* — Erma Cameron

(74) *Attorney, Agent, or Firm* — Clark & Brody

(57) ABSTRACT

There is provided an antioxidant agent capable of preventing scale from being produced on the surface of a heated metallic starting material more effectively than the conventional antioxidant agent. The antioxidant agent according to the present invention contains a plurality of glass frits having different softening points and an inorganic compound having a melting point not higher than 600° C. The inorganic compound mainly softens in the low-temperature range of about 600° C. The plurality of glass frits mainly soften in the low-temperature range of about 600 to 1300° C. Therefore, the antioxidant agent covers the surface of metallic starting material in a broad temperature range, oxidizes the surface of metallic starting material, and prevents the production of scale.

13 Claims, 7 Drawing Sheets

ANTIOXIDANT AGENT AND PROCESS FOR PRODUCING METALLIC MATERIAL

TECHNICAL FIELD

The present invention relates to an antioxidant agent, a process for producing the antioxidant agent, and a process for producing a metallic material. More particularly, it relates to an antioxidant agent intended to be applied to the surface of a metallic material to be heated, a process for producing the antioxidant agent, and a process for producing a metallic material.

BACKGROUND ART

JP2007-314780 (Patent Document 1) discloses a lubricant composition for hot extrusion working, and WO2007/122972 (Patent Document 2) discloses a lubricant composition for hot plastic working. The lubricant compositions disclosed in these Patent Documents contain a plurality of glass frits having different softening points, and are applied to the surface of a starting material to be subjected to hot plastic working.

DISCLOSURE OF THE INVENTION

The lubricant compositions disclosed in Patent Documents 1 and 2 prevent oxides (hereinafter, referred to as scale) from being formed on the surface of a heated starting material to some extent. However, even if these lubricant compositions are used, scale is still produced on the surface of the heated starting material.

An objective of the present invention is to provide an antioxidant agent for preventing the production of scale on the surface of a heated metallic starting material more effectively than the conventional antioxidant agents.

The antioxidant agent according to the present invention contains a plurality of glass frits having different softening points and an inorganic compound having a melting point not higher than 600° C. The antioxidant agent according to the present invention is intended to be applied to the surface of a metallic starting material to be heated.

For the antioxidant agent according to the present invention, the inorganic compound and the glass frits are softened in that order with the increase in temperature of the metallic starting material, and the softened inorganic compound and glass frits cover the surface of the metallic starting material. Therefore, the antioxidant agent according to the present invention prevents scale from being produced on the surface of the metallic starting material.

Preferably, the inorganic compound is an inorganic salt and/or an oxide each having a melting point of 400° C. to 600° C. Or, preferably, the inorganic compound is boric acid and/or boron oxide.

Preferably, the plurality of glass frits contain high-temperature glass frits and medium-temperature glass frits. The viscosity at 1200° C. of the high-temperature glass frits is $2 \times 10^2$ to $10^6$ dPa·s. The viscosity at 700° C. of the medium-temperature glass frits is $2 \times 10^2$ to $10^6$ dPa·s.

In this case, the high-temperature glass frits, the medium-temperature glass frits, and inorganic compound soften in different temperature ranges. Therefore, the antioxidant agent covers the surface of metallic starting material in a temperature range broader than that of the conventional antioxidant agent. For this reason, scale is less liable to be produced on the surface of metallic starting material. The "viscosity" in this description means so-called "static viscosity".

Preferably, the antioxidant agent further contains an alkali metal salt.

In this case, the secular change of viscosity of the antioxidant agent is restrained.

Preferably, the antioxidant agent further contains an insoluble group 2 metal salt. Preferably, the insoluble group 2 metal salt is magnesium carbonate and/or calcium carbonate.

In this case, the secular change of viscosity of antioxidant agent is restrained.

The process for producing the antioxidant agent according to the present invention includes a step of producing a mixed composition by grinding and mixing the plurality of glass frits having different softening points, the boric acid and/or boron oxide, and water by using a grinding device, and a step of producing the antioxidant agent by mixing water having a temperature not higher than normal temperature with the mixed composition.

In this case, the boric acid or boron oxide dissolved in water is less liable to crystallize.

The process for producing a metallic material according to the present invention includes a step of applying the above-described antioxidant agent to the surface of a metallic starting material, and a step of heating the metallic starting material to which the lubricant composition has been applied. The "heating" in this description includes heating for heat-treating (quenching, tempering, etc.) the metallic starting material, and heating for hot-working the metallic starting material. The hot working includes hot extrusion working, hot piercing rolling, hot rolling, and hot forging.

In this case, scale is less liable to be produced on the heated metallic starting material.

BEST MODE FOR CARRYING OUT THE INVENTION

Figure 1:
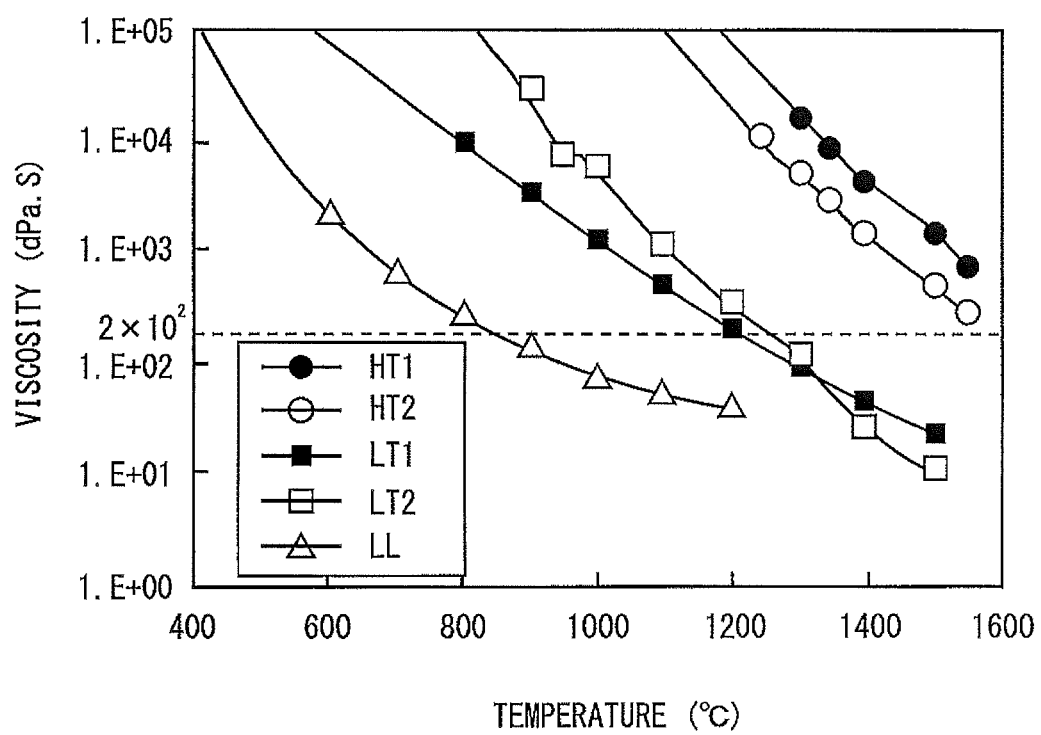
FIG. 1 is a diagram showing the relationship between the viscosity and temperature of a component contained in an antioxidant agent according to an embodiment of the present invention.

Embodiments of the present invention will now be described in detail with reference to the accompanying drawings. In the figures, the same symbols are applied to the same or equivalent parts, and the explanation of the parts is not repeated.

The present inventors examined the cause for some amount of scale produced on the surface of a heated metallic starting material even if a lubricant composition disclosed in Patent Document 1 or 2 is used. As the result of examination, the present inventors obtained the findings described below.

(1) Not only in the medium-temperature range and high-temperature range in which the heating temperature is higher than 600° C. but also in the low-temperature range in which the heating temperature is not higher than 600° C., scale is produced on the surface of the metallic starting material. Hereinafter, the temperature range of not higher than 600° C. is referred to as a "low-temperature range".

(2) The lubricant compositions disclosed in Patent Documents 1 and 2 contain the plurality of glass frits having different softening points. The plurality of glass frits soften in the medium-temperature range and high-temperature range, and cover the metal surface. In the low-temperature range, however, the glass frits are less liable to soften. Therefore, in the low-temperature range, in some cases, the surface of the metallic starting material is not protected sufficiently by the lubricant composition, and the surface is partially exposed. Since the exposed portion comes into contact with the outside air, the exposed portion oxidizes, and scale is liable to be produced.

(3) The inorganic compound having a melting point not higher than 600° C. softens in the low-temperature range, and covers the metal surface. Therefore, in the low-temperature range, scale can be prevented from being produced on the surface of metallic starting material. If the antioxidant agent contains the plurality of glass frits having different softening points and the inorganic compound having a melting point not higher than 600° C., the antioxidant agent softens in a broad temperature range of low-, medium-, and high-temperature ranges, and covers the surface of metallic starting material. For this reason, scale can be prevented from being produced on the surface of metallic starting material.

(4) In the case where the antioxidant agent is slurry at normal temperature, and contains the plurality of glass frits having different softening points and the above-described inorganic compound, the viscosity of antioxidant agent at normal temperature sometimes changes with time. If the antioxidant agent at normal temperature contains an alkali metal salt, the viscosity of antioxidant agent is prevented from changing with time.

(5) If the antioxidant agent contains an insoluble group 2 metal salt, the long-term secular change of viscosity of antioxidant agent is prevented. Herein, the group 2 metal salt is a salt of group 2 metal in the periodic table. Also, "insoluble" means insoluble in water, and "insoluble in water" means that the solubility in water of 25° C. is not higher than 1000 ppm.

The antioxidant agent according to this embodiment is based on the above-described findings. Hereunder, the details of the antioxidant agent are explained.

[Constitution of Antioxidant Agent]

The antioxidant agent according to this embodiment contains the plurality of glass frits having different softening points and the inorganic compound having a melting point not higher than 600° C. Hereinafter, the inorganic compound having a melting point not higher than 600° C. is referred to as a "low-temperature inorganic compound". The details of the glass frits and inorganic compound are explained.

[Glass Frits]

The plurality of glass frits are produced by the process described below. A plurality of well-known inorganic components constituting glass are mixed with each other. The mixed plurality of inorganic components are melted to produce molten glass. The molten glass is rapidly cooled in water or air and is solidified. The solidified glass is ground as necessary. The glass frits are produced by the steps described above.

The glass frits are of a flake form or a powder form. As described above, the glass frits contain the plurality of well-known inorganic components. Therefore, the melting point of glass frits is not identified definitely. In the case where each of inorganic components in the glass frits is heated singly, each inorganic component liquefies at its melting point. However, in the case of glass frits, as the temperature rises, the inorganic components in the glass frits begin to liquefy at temperatures different from each other. For this reason, with the increase in temperature, the glass frits soften gradually. Therefore, as compared with the case where the inorganic components are used singly as an antioxidant agent, the glass frits produced by melting the plurality of inorganic components are liable to adhere stably to the surface of the heated metallic starting material. The glass frits can be regulated so as to have a viscosity suitable for coating the surface of metallic starting material.

The plurality of glass frits contain high-temperature glass frits and medium-temperature glass frits. The high-temperature glass frits have a softening point higher than that of the medium-temperature glass frits. Hereunder, the details of the high-temperature glass frits and medium-temperature glass frits are explained.

[High-Temperature Glass Frits]

The high-temperature glass frits have a high softening point. The antioxidant agent has a proper viscosity in a high-temperature range of not lower than 1000° C. on account of the plurality of high-temperature glass frits. The antioxidant agent can wettingly spread on the surface of metallic starting material, and can cover the metal surface at the high-temperature range of not larger than 1000° C. At this time, the antioxidant agent adheres to the surface of metallic starting material.

In effect, due to the high-temperature glass frits, the antioxidant agent prevents the surface of metallic starting material from coming into contact with the outside air in the high-temperature range. Therefore, the antioxidant agent can prevent scale from being produced on the surface of metallic starting material in the high-temperature range.

If the antioxidant agent does not contain high-temperature glass frits, in the high-temperature range, the viscosity of the antioxidant agent becomes too low. Therefore, the antioxidant agent becomes less liable to adhere stably to the surface of metallic starting material, and becomes liable to flow down from the surface. If the antioxidant agent flows down, the surface of metallic starting material is partially exposed. The exposed surface portion comes into contact with the outside air, and scale is produced.

The preferable viscosity at 1200° C. of the high-temperature glass frits is $2 \times 10^2$ to $10^6$ dPa·s. If the viscosity at 1200° C. of the high-temperature glass frits is too low, in the high-temperature range, the antioxidant agent is less liable to adhere to the surface of metallic starting material, and is liable to flow down from the surface of metallic starting material. On the other hand, if the viscosity at 1200° C. of the high-temperature glass frits is too high, in the high-temperature range, the antioxidant agent is liable to peel off the surface of metallic starting material. If the viscosity at 1200° C. of the high-temperature glass frits is $2 \times 10^2$ to $10^6$ dPa·s, in a high-temperature range of 1000 to 1400° C., the high-temperature glass frits soften, and becomes liable to adhere to the surface of metallic starting material. Therefore, in the high-temperature range, the antioxidant agent is liable to cover the surface of metallic starting material, and is liable to adhere stably to the surface of metallic starting material. The preferable upper limit of the viscosity at 1200° C. of the high-temperature glass frits is $10^5$ dPa·s, and the preferable lower limit thereof is $10^3$ dPa·s.

In the case where the high-temperature glass frits are of a spherical powder form, the preferable particle diameter is not larger than 25 μm. The particle diameter herein is a volume mean particle diameter $D_{50}$. The volume mean particle diameter $D_{50}$ is determined by the method described below. By using a particle counter, the volume particle size distribution of the high-temperature glass frits is determined. By using the obtained volume particle size distribution, the particle diameter at which the cumulative volume becomes 50% from the small particle diameter side in a cumulative volume distribution is defined as a volume mean particle diameter $D_{50}$.

If the particle diameter is not larger than 25 μm, at normal temperature, the high-temperature glass frits are liable to disperse in a liquid.

As described above, the high-temperature glass frits contain the plurality of well-known inorganic components. For example, the high-temperature glass frits contain 60 to 70 mass % of silicon dioxide ($SiO_2$), 5 to 20 mass % of aluminum oxide ($Al_2O_3$), and 0 to 20 mass % of calcium oxide (CaO). Calcium oxide is an optional compound, and need not be contained. Further, the high-temperature glass frits contain one or more kinds of magnesium oxide (MgO), zinc oxide (ZnO), and potassium oxide ($K_2O$). The inorganic components constituting the high-temperature glass frits are not limited to the above-described examples. In effect, the high-temperature glass frits can be produced by the well-known inorganic components constituting the glass.

[Medium-Temperature Glass Frits]

The medium-temperature glass frits have a softening point lower than that of the high-temperature glass frits. The antioxidant agent has a proper viscosity in a medium-temperature range of 600 to 1000° C. on account of medium-temperature glass frits. Therefore, the antioxidant agent wettingly spreads on the whole surface of the metallic starting material not only in the high-temperature range but also in the medium-temperature range, and covers the surface. Further, in the medium-temperature range, the antioxidant agent adheres stably to the surface of metallic starting material. Therefore, in the medium-temperature range, the surface of metallic starting material is prevented from coming into contact with the outside air, and the production of scale is prevented.

If the antioxidant agent does not contain the medium-temperature glass frits, the antioxidant agent in the medium-temperature range is less liable to adhere to the surface of metallic starting material. Therefore, in the medium-temperature range, the antioxidant agent flows down from the surface of metallic starting material, or peels off, and thereby the surface of metallic starting material is partially exposed. The exposed portion comes into contact with the outside air, and scale is liable to be produced.

The preferable viscosity at 700° C. of the medium-temperature glass-frits is $2 \times 10^2$ to $10^6$ dPa·s. If the viscosity of the medium-temperature glass-frits is too low, in the medium-temperature range, the antioxidant agent is less liable to adhere to the surface of metallic starting material, and is liable to run down from the surface of metallic starting material. On the other hand, if the viscosity of the medium-temperature glass-frits is too high, the antioxidant agent does not soften sufficiently in the medium-temperature range. Therefore, the antioxidant agent becomes liable to peel off the surface of metallic starting material. If the viscosity at 700° C. of the medium-temperature glass-frits is $2 \times 10^2$ to $10^6$ dPa·s, in the medium-temperature range of 600 to 1000° C., the medium-temperature glass-frits soften, and becomes liable to adhere to the surface of metallic starting material. Therefore, in the medium-temperature range, the antioxidant agent becomes liable to cover the surface of metallic starting material. The preferable upper limit of the viscosity at 700° C. of the medium-temperature glass frits is $10^5$ dPa·s, and the preferable lower limit thereof is $10^3$ dPa·s.

In the case where the medium-temperature glass frits are of a spherical powder form, the preferable particle diameter of the medium-temperature glass frits is not larger than 25 μm. The definition of the particle diameter of the medium-temperature glass frits is the same as that of the above-described particle diameter of the high-temperature glass frits. That is, the particle diameter of the medium-temperature glass frits is a volume mean particle diameter $D_{50}$. If the particle diameter is not larger than 25 μm, the medium-temperature glass frits disperse stably in a liquid. Therefore, when the antioxidant agent is applied to the surface of metallic starting material, the medium-temperature glass frits are liable to disperse substantially uniformly to the whole surface of the metallic starting material.

For example, the medium-temperature glass frits contain 40 to 60 mass % of $SiO_2$, 0 to 10 mass % of $Al_2O_3$, 20 to 40 mass % of $B_2O_3$, 0 to 10 mass % of ZnO, and 5 to 15 mass % of $Na_2O$. Further, the medium-temperature glass frits may contain one or more kinds of MgO, CaO, and $K_2O$. The inorganic components constituting the medium-temperature glass frits are not limited to the above-described examples. The medium-temperature glass frits can be produced by the well-known inorganic components constituting the glass.

[Low-Temperature Inorganic Compound]

The antioxidant agent according to this embodiment further contains the inorganic compound having a melting point not higher than 600° C. (low-temperature inorganic compound). The low-temperature inorganic compound preferably has a melting point of 400 to 600° C. On account of the low-temperature inorganic compound, the antioxidant agent wettingly spreads on the whole surface of the metallic starting material in the low-temperature range of not higher than 600° C., and is liable to adhere to the surface of metallic starting material. That is, in the low-temperature range, the low-temperature inorganic compound prevents the surface of metallic starting material from coming into contact with the outside air, and prevents scale from being produced in the low-temperature range.

If the antioxidant agent does not contain the low-temperature inorganic compound, in the low-temperature range, the antioxidant agent does not wettingly spread sufficiently on the surface of metallic starting material. Therefore, the surface of metallic starting material comes into partial contact with the outside air, and scale is produced in the portion contacting with the outside air.

The preferable low-temperature inorganic compound is an inorganic salt and/or an oxide having a melting point of 400 to 600° C. The oxide having a melting point not higher than 600° C. is, for example, boric acid ($H_3BO_3$) or boron oxide ($B_2O_3$). If being heated, boric acid turns to boron oxide. The melting point of boron oxide is about 450° C. The inorganic salt having a melting point not higher than 600° C. is, for example, phosphate, thallium bromide (TlBr), or silver metaphosphate ($AgO_3P$). The melting point of thallium bromide is about 480° C., and the melting point of silver metaphosphate is about 480° C. Further preferably, the low-temperature inorganic compound is boric acid and/or boron oxide.

[Relationship Between Viscosities of High-Temperature and Medium-Temperature Glass Frits and Viscosity of Low-Temperature Inorganic Compound]

FIG. 1 is a diagram showing the relationship between the viscosities of high-temperature and medium-temperature glass frits and the viscosity of low-temperature inorganic compound. FIG. 1 was obtained by the process described below. High-temperature glass frits HT1 and HT2, medium-temperature glass frits LT1 and LT2, and low-temperature inorganic compound LL given in Table 1 were prepared.

TABLE 1

| | Chemical composition (wt %) | | | | | | | |
|---|---|---|---|---|---|---|---|---|
| | $SiO_2$ | $Al_2O_3$ | $B_2O_3$ | CaO | MgO | ZnO | $Na_2O$ | $K_2O$ |
| High-temperature glass frits HT1 | 66.1 | 9.6 | — | 13.1 | 1.6 | 3.0 | — | 6.4 |
| Medium-temperature glass frits LT1 | 51.7 | 2.6 | 28.4 | 0.2 | — | 6.3 | 8.7 | 2.0 |
| High-temperature glass frits HT2 | 65-70 | 5-10 | 1-3 | 10-15 | 0-3 | — | — | 5-10 |
| Medium-temperature glass frits LT2 | 50-55 | 0-5 | 20-25 | 5-10 | 0-3 | — | 10-15 | 0-5 |
| Low-temperature inorganic compound LL | — | — | 100 | — | — | — | — | — |

Referring to Table 1, the low-temperature inorganic compound LL was boron oxide. By heating the components (HT1, HT2, LT1, LT2, and LL), the viscosities at respective temperatures were measured. For the measurement of viscosity, the well-known platinum ball pulling-up method was used. Specifically, a platinum ball submerged in molten glass was pulled up. Based on the load applied to the platinum ball at this time and the pulling-up speed, the viscosity of molten glass was determined.

Referring to FIG. 1, the symbol "●" in the figure denotes the viscosity of the high-temperature glass frits HT1. The symbol "○" denotes the viscosity of the high-temperature glass frits HT2. The symbol "■" denotes the viscosity of the medium-temperature glass frits LT1. The symbol "□" denotes the viscosity of the medium-temperature glass frits LT2. The symbol "Δ" denotes the viscosity of the viscosity of the low-temperature inorganic compound LL.

Referring to FIG. 1, the viscosity of the low-temperature inorganic compound LL was $2 \times 10^2$ to $10^6$ dPa·s in the temperature range of 400 to 800° C., and was not lower than $10^3$ dPa·s in the temperature range of not higher than 600° C. The viscosities of the medium-temperature glass frits LT1 and LT2 were $2 \times 10^2$ to $10^6$ dPa·s in the temperature range of 600 to 1200° C. That is, at 700° C., the viscosities of the medium-temperature glass frits LT1 and LT2 were in the range of $2 \times 10^2$ to $10^6$ dPa·s. The viscosities of the high-temperature glass frits HT1 and HT2 were $2 \times 10^2$ to $10^6$ dPa·s in the temperature range of 1000 to 1550° C. That is, at 1200° C., the viscosities of the high-temperature glass frits HT1 and HT2 were in the range of $2 \times 10^2$ to $10^6$ dPa·s.

As described above, with the increase in temperature, the viscosity lowers in the order of low-temperature inorganic compound, medium-temperature glass frits, and high-temperature glass frits, and softening occurs. The antioxidant agent contains the high-temperature glass frits, the medium-temperature glass frits, and the low-temperature inorganic compound. Therefore, the antioxidant agent is capable of having a viscosity of a degree such as to be able to adhere stably to the surface of metallic starting material in a broad temperature range (400 to 1550° C.)

[Other Constitutions of Antioxidant Agent]

As described above, the antioxidant agent contains the high-temperature glass frits, the medium-temperature glass frits, and the low-temperature inorganic compound. Further, the antioxidant agent may contain one or more kinds of water, a suspending agent, an antislipping agent (friction coefficient increasing agent), and a gluing agent.

[Water]

Water is mixed with the high-temperature glass frits, the medium-temperature glass frits, and the low-temperature inorganic compound to produce slurry. If water is mixed, the antioxidant agent turns to slurry. Therefore, the antioxidant agent is liable to be applied substantially uniformly to the surface of metallic starting material before being heated.

[Suspending Agent]

The suspending agent causes the high-temperature and medium-temperature glass frits and the like to disperse substantially uniformly in a solution (water). The suspending agent is, for example, clay. The clay is less liable to generate gas even if being heated. Further, the clay is not destroyed by fire. Therefore, the clay prevents the glass frits (the high-temperature and medium-temperature glass frits) from coming off the surface of metallic starting material.

The clay contains, for example, 50 to 60 mass % of $SiO_2$ and 10 to 40 mass % of $Al_2O_3$, and further contains, as other minor components, one or more kinds selected from a group consisting of $Fe_2O_3$, CaO, MgO, $Na_2O$, and $K_2O$.

One example of clay contains about 55 mass % of $SiO_2$, and about 30 mass % of $Al_2O_3$, and $Fe_2O_3$, CaO, MgO, $Na_2O$, $K_2O$, and the like as other minor components. Another example of clay contains about 60 mass % of $SiO_2$ and about 15 mass % of $Al_2O_3$, and $Fe_2O_3$, CaO, MgO, $Na_2O$, $K_2O$, and the like as other minor components.

As described above, the suspending agent causes the glass frits to disperse substantially uniformly in a solution. Therefore, when the antioxidant agent is applied to the surface of metallic starting material before being heated, the glass frits disperse substantially uniformly to the surface of metallic starting material. Further, the suspending agent causes the applied glass frits to bond to the surface of metallic starting material, and prevents the glass frits from coming off the surface of metallic starting material.

[Antislipping Agent]

The heated metallic starting material is sometimes hot-worked. In this case, the metallic starting material is rolled by a rolling roll to produce a metal plate or a metal bar. Also, the metallic starting material is piercing-rolled by the plug and inclined rolls of a piercing machine to produce a metal pipe. Therefore, the metallic starting material is preferably liable to be caught by the rolling rolls or the inclined rolls. If the friction coefficient of metallic starting material against a hot-working roll such as the rolling roll and the inclined roll is high, the metallic starting material is liable to be caught by the hot-working rolls.

Therefore, the antioxidant agent may contain the antislipping agent to increase the friction coefficient. The antislipping agent is, for example, an oxide having a high melting point. The antislipping agent is, for example, alumina or silica. When the metallic starting material to which the antioxidant agent is applied comes into contact with the rolls, the antislipping agent such as alumina or silica comes into contact with the rolls. At this time, since the friction coefficient of metallic starting material against the rolls becomes high, the metallic starting material becomes liable to be caught by the rolls.

[Gluing Agent]

The antioxidant agent may further contain the gluing agent to improve the adhering force to the surface of metallic starting material. The gluing agent is, for example, an organic binder. The organic binder is, for example, an acrylic resin.

Further, the antioxidant agent may contain an alkali metal salt or an insoluble (that is, insoluble in water) group 2 metal salt. These components prevent the viscosity of the antioxidant agent from changing with time.

[Alkali Metal Salt]

As described above, the antioxidant agent containing water is slurry (a fluid) at normal temperature. In the case where the antioxidant agent contains less than 50 wt % of water, at normal temperature, the antioxidant agent sometimes sets to gel with the elapse of time. The gelation increases the viscosity of the antioxidant agent. Also, gel lumps are sometimes produced.

It is preferable that the secular change of viscosity of the antioxidant agent be restrained. The alkali metal salt peptizes the antioxidant agent having set to gel. Therefore, the antioxidant agent fluidizes again, and the increase in viscosity is prevented. The alkali metal salt is, for example, potassium carbonate ($KCO_3$), sodium hexametaphosphate, or the like.

[Insoluble Group 2 Metal Salt]

In the case where the antioxidant agent contains not less than 55 wt % of water, at normal temperature, the viscosity of antioxidant agent sometimes decreases with the elapse of time. Such a secular change of viscosity is preferably restrained.

The insoluble group 2 metal salt prevents the decrease in viscosity of the antioxidant agent. Herein, the group 2 metal salt is a metal salt corresponding to a group 2 element in the periodic table, such as beryllium, magnesium, calcium, strontium, barium, or radium. Also, "insoluble" means insoluble in water, and "insoluble in water" means that the solubility in water of 25° C. is not higher than 1000 ppm. Preferably, the insoluble group 2 metal salt is magnesium carbonate and/or calcium carbonate.

The insoluble group 2 metal salt prevents the decrease in viscosity of the antioxidant agent having been produced. As the reason for this, the reason described below is presumed. The insoluble group 2 metal salt dissolves gradually in a solution (water). When the insoluble group 2 metal salt dissolves, group 2 metal ions are formed. Since the group 2 metal ions improve the suspension force, the secular change of viscosity of the antioxidant agent is restrained.

[Other Components]

The antioxidant agent may contain other components in addition to the above-described components. For example, the antioxidant agent may contain an inorganic electrolyte represented by sodium nitrite.

[Preferable Content of Each Component in Antioxidant Agent]

The content of each component contained in the antioxidant agent according to this embodiment is not subject to any special restriction. In the antioxidant agent, the preferable content of each component with respect to 100 weight parts of high-temperature glass frits are as described below. The preferable content of medium-temperature glass frits is 4 to 20 weight parts. The preferable content of low-temperature inorganic compound is 4 to 20 weight parts. The preferable content of water is not less than 100 weight parts. If the content of water is regulated, the viscosity of the antioxidant agent can be regulated to such a degree that the antioxidant agent can be applied to the surface of metallic starting material substantially uniformly at normal temperature.

The preferable content of the suspending agent is 2 to 30 weight parts with respect to 100 weight parts of high-temperature glass frits. The preferable content of the gluing agent is 1.0 to 4.0 weight parts. The preferable contents of the alkali metal salt and the insoluble group 2 metal salt are 0.1 to 1.5 weight part, respectively.

If the components in the antioxidant agent satisfy the above-described preferable contents, the above-described effects of the antioxidant agent are achieved especially effectively. However, even if the content of each of the components exceeds the preferable range, the effects of the antioxidant agent can be achieved to some extent.

[Process for Producing Antioxidant Agent]

The antioxidant agent according to this embodiment is obtained by mixing the above-described components. In the case where the low-temperature inorganic compound is boric acid and/or boron oxide, the preferable process for producing the antioxidant agent is as described below.

Figure 2:
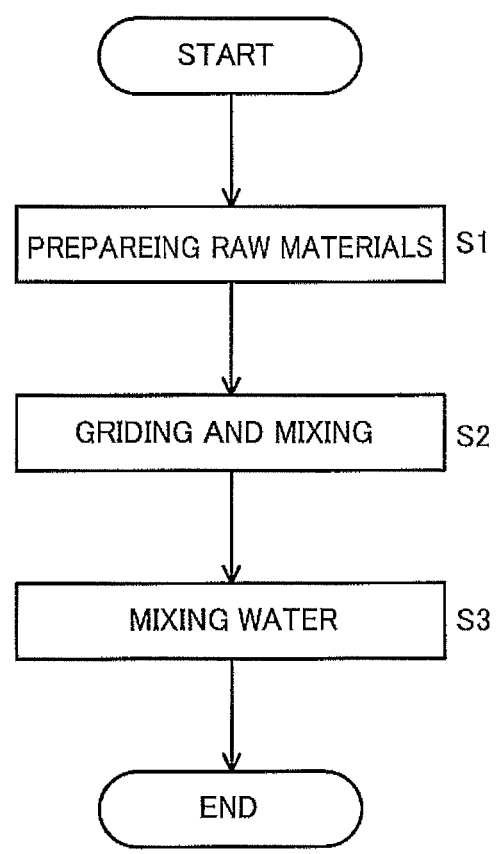
FIG. 2 is a flowchart showing one example of a process for producing the antioxidant agent according to an embodiment of the present invention.

FIG. 2 is a flowchart showing one example of the process for producing the antioxidant agent according to this embodiment. Referring to FIG. 2, first, the plurality of components contained in the antioxidant agent are prepared (S1). For example, the high-temperature glass frits, the medium-temperature glass frits, boric acid and/or boron oxide, which are the low-temperature inorganic compounds, and water are prepared. Next, by using a grinding device, the plurality of components are ground and mixed to produce a mixed composition (S2). The grinding device is, for example, a ball mill, a rod mill, a vibrating mill, a planetary mill, a tower mill, an attritor, a sand mill, or the like. The grinding device includes a cylindrical grinding vessel. The prepared components are put in the grinding vessel. In the grinding vessel, balls or rods are further put. By rotating or vibrating the grinding vessel, the high-temperature glass frits and the medium-temperature glass frits are ground, and particles each having a particle diameter of, for example, not larger than 25 μm are formed.

When the mixing and grinding step is performed, the amount of water that is put in the grinding vessel is made smaller than the amount of water to be contained in the antioxidant agent. For example, the amount of water put in the grinding vessel in Step S2 is made about a half of the amount of water to be contained in the antioxidant agent.

During the time when the mixing and grinding step is performed, the grinding vessel is rotated or vibrated. At this time, the temperature of water in the vessel rises to a temperature of about 50 to 80° C. The solubility of the boric acid and/or boron oxide (hereinafter, referred to as boric acid and the like) becomes high with the increase in temperature of solvent (water). Therefore, the boric acid and the like dissolve in water during the mixing and grinding step.

The mixed composition produced in the above-described steps is slurry. However, after the mixing and grinding step has been finished, the temperature of the mixed composition lowers from the temperature of 50 to 80° C. to normal temperature. When the temperature lowers, the boric acid and the like sometimes crystallize and precipitate. If the boric acid and the like precipitate, the boron oxide is distributed nonuniformly on the surface of metallic starting material when the antioxidant agent is applied to the surface of metallic starting material. Therefore, it is preferable that the boric acid and the like do not crystallize.

Accordingly, in the case where the low-temperature inorganic compound is boric acid and the like, water having a temperature not higher than normal temperature is mixed with the mixed composition (S3). Preferably, water having a temperature not higher than 25° C. is added. At this time, the amount of water contained in Steps S2 and S3 is regulated so that the total sum of the amount of water contained in Step S2 and the amount of water contained in Step S3 is equal to the amount of water to be contained in the antioxidant agent.

As described above, the mixed composition having been ground and mixed has a temperature higher than normal temperature. If water having a temperature not higher than normal temperature is mixed with the mixed composition in Step S3, the boric acid and the like are less liable to crystallize. When water having a temperature not higher than normal temperature is added to the mixed composition, the temperature of the mixed composition lowers, and the amount of solvent (water) also increases. Therefore, it is presumed that the boric acid and the like are less liable to recrystallize.

In the case where the low-temperature inorganic compound is any other compound other than boric acid and the like, the above-described Step S3 need not be performed.

Other components other than the above-described components of the antioxidant agent (suspending agent, antislipping agent, gluing agent, potassium carbonate, group 2 metal salt insoluble in water, etc.) are added as necessary in Step S2.

By the above-described producing process, the antioxidant agent is produced. As described above, the produced antioxidant agent wettingly spreads on the surface of metallic starting material, and has a viscosity of such a degree as to adhere stably. Therefore, the antioxidant agent can cover the surface of metallic starting material being heated, and can prevent scale from being produced on the surface of metallic starting material.

[Process for Producing Metallic Material]

Figure 3:
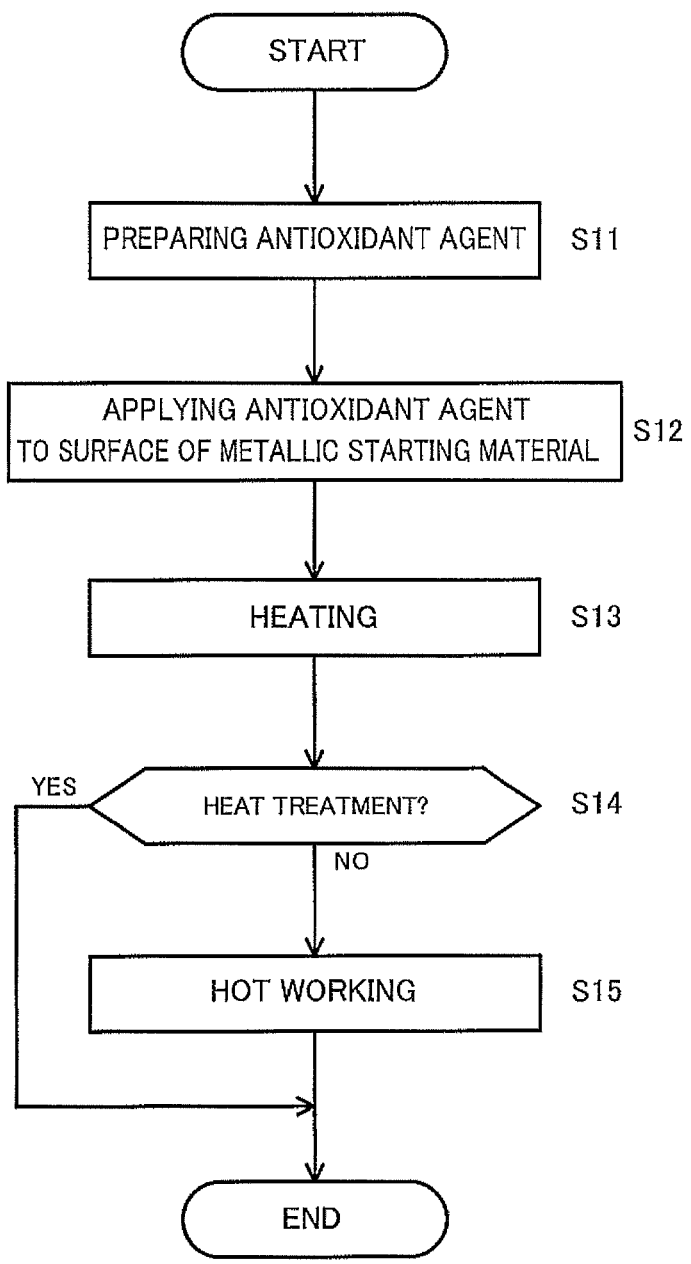
FIG. 3 is a flowchart showing one example of a process for producing a metallic material according to an embodiment of the present invention.

FIG. 3 is a flowchart showing one example of a process for producing a metallic material using the above-described antioxidant agent. Referring to FIG. 3, first, the antioxidant agent according to this embodiment is prepared (S11). The antioxidant agent is produced by the above-described process.

Successively, the antioxidant agent is applied to the surface of metallic starting material before being heated (S12). The type of the metallic starting material is not subject to any special restriction. The metallic starting material consists of, for example, steel, titanium, titanium alloy, any other alloy, or the like. The steel is, for example, a carbon steel, a ferritic stainless steel, a martensitic stainless steel, an austenitic stainless steel, an alloy steel, or the like. The shape of the metallic starting material is ingot, slab, bloom, billet, plate material, bar material represented by rod material and wire rod, pipe, or the like.

The process for applying the antioxidant agent is not subject to any special restriction. A worker may apply the antioxidant agent to the surface of metallic starting material by using a brush. Also, the antioxidant agent may be applied to the surface of metallic starting material by using a spray or the like. A bath in which the antioxidant agent is stored may be prepared, and the metallic starting material may be immersed in the antioxidant agent in the bath (so-called "dipping"). By any of these applying processes, the antioxidant agent is applied to the surface of metallic starting material. After the antioxidant agent has been applied to the surface of metallic starting material, the antioxidant agent may be dried.

Successively, the metallic starting material to which the antioxidant agent has been applied is heated (S13). At this time, the antioxidant agent softens and covers the surface of metallic starting material. As described above, in the board temperature range from a low temperature of about 400° C. to a high temperature of about 1400° C., the antioxidant agent adheres stably to the surface of metallic starting material. Therefore, scale is less liable to be produced on the surface of the heated metallic starting material.

[In the Case where Metallic Starting Material is Heat-Treated]

In the case where the metallic starting material is heat-treated, the heat treatment temperature is sometimes not higher than 1000° C. For example, the quenching temperature of stainless steel is about 900 to 1000° C. Also, the tempering temperature is about 500 to 650° C. In the case where the metallic starting material is heat-treated, the metallic starting material is put in a heat treating furnace, and the metallic starting material is heated to the heat treatment temperature. At this time, the in-furnace temperature is increased stepwise with the elapse of time. The in-furnace temperature is controlled by a control unit, and is raised stepwise according to a predetermined heat pattern.

When the in-furnace temperature and the temperature of metallic starting material are in a low-temperature range, the low-temperature inorganic compound of the antioxidant agent mainly softens, and covers the surface of metallic starting material. When the in-furnace temperature and the temperature of metallic starting material become in a medium-temperature range, the low-temperature inorganic compound melts, and the viscosity thereof decreases. However, the medium-temperature glass frits begin to soften. Therefore, in place of the low-temperature inorganic compound, the medium-temperature glass frits cover the surface of metallic starting material. When the in-furnace temperature becomes a temperature close to 1000° C., the high-temperature glass frits also begin to soften, and begin to function as an antioxidant agent.

As described above, in the case where the metallic starting material is heat-treated at a temperature not higher than 1000° C., the low-temperature inorganic compound and the medium-temperature glass frits mainly cover the surface of metallic starting material, and prevent the production of scale. In effect, the antioxidant agent according to this embodiment can cover the surface of metallic starting material even in the low-temperature range. Therefore, scale is less liable to be produced.

[In the Case where Metallic Starting Material is Hot-Worked]

In the case where the metallic starting material is hot-worked to produce a metallic material such as steel material, steel bar, steel pipe, and the like, the metallic starting material is heated to various temperature ranges.

For example, when a steel starting material (round billet) is piercing-rolled by the Mannesmann pipe making process to produce a steel pipe, the steel starting material is heated to a temperature of 1100 to 1300° C. in a heating furnace or a soaking pit. On the other hand, in the Ugine pipe making process in which the steel starting material is extruded to produce a steel pipe, the steel starting material is heated to a temperature of 800 to 1000° C. in a heating furnace or a soaking pit. The steel starting material heated in the heating furnace or the soaking pit is, in some cases, further heated to 1200° C. in a short period of time by high-frequency heating. Further, when a starting material consisting of titanium or titanium alloy is hot-worked to produce a titanium material having a predetermined shape (plate, bar, or pipe), the heating temperature of a titanium or titanium alloy starting material is higher than the heating temperature of the steel starting material.

Thus, the heating temperature differs according to the type and producing process of metallic starting material. However, the antioxidant agent according to this embodiment can respond to various heating temperatures.

The heating furnace is generally divided into a plurality of zones from a charging port (an inlet for the metallic starting material to enter into the heating furnace) to an extracting port (an outlet for the metallic starting material to come out of the heating furnace). The in-furnace temperature of each zone is set so as to become higher gradually from the charging port toward the extracting port. For example, the heating temperature in the zone closest to the charging port is set at a temperature of about 400 to 600° C., and the heating temperature in the zone closest to the extracting port is set at the target temperature of the metallic starting material (for example, 1200 to 1300° C.). The metallic starting material charged into the heating furnace is conveyed to the zones in sequence. At this time, the temperature of the metallic starting material rises stepwise.

In the case where the metallic starting material is heated in a soaking pit, as in the heat treating furnace, the pit temperature of the soaking pit is raised stepwise with the elapse of time, and is kept at the target temperature for a predetermined period of time.

Therefore, the temperature of the metallic starting material charged into the soaking pit is also raised stepwise with the elapse of time.

The metallic starting material in the heating furnace or the soaking pit is first heated at a low temperature of about 400 to 600° C. At this time, of the antioxidant agent, the low-temperature inorganic compound mainly softens, and covers the surface of metallic starting material. Next, when the metallic starting material is heated at a medium temperature (about 600 to 1000° C.), the medium-temperature glass frits mainly soften, and cover the surface of metallic starting material. Then, when the metallic starting material is heated at a high temperature (not lower than 1000° C.), the high-temperature glass frits mainly soften, and cover the surface of metallic starting material.

In effect, the antioxidant agent according to this embodiment adheres stably to the surface of metallic starting material in the broad range from the low-temperature range to the high-temperature range, and covers the surface of metallic starting material. Therefore, in various producing steps having different heating temperatures, by heating, scale can be prevented from being formed on the surface of metallic starting material.

For example, in the case where hot working is performed by using rolls, if scale is produced on the metallic starting material, together with the metallic starting material, scale is also caught by the rolls in some cases. In this case, the scale is pushed in the surface of metallic starting material by the rolls, and irregular flaws are sometimes formed on the surface. The antioxidant agent according to this embodiment prevents the production of scale. Therefore, at the time of hot working, the flaws caused by scale are prevented from being formed.

Returning to FIG. 3, if a heat treatment step is being performed (YES in S14), after heating, heat treatment is finished through a predetermined heat treatment step. On the other hand, if a hot working step is being performed (NO in S14), the metallic starting material is hot-worked (S15). By the hot working, the metallic starting material is produced into a desired metallic material (pipe material, plate material, bar material, etc.)

In the case where the antioxidant agent contains the antislipping agent, the antioxidant agent prevents the slippage of metallic starting material with respect to the rolls of a rolling mill. For example, in the case where the antioxidant agent contains alumina particles as the antislipping agent, the alumina particles adhere to the surface of the heated metallic starting material. The metallic starting material to which the alumina particles have adhered is conveyed to the rolling mill. When the front end of metallic starting material comes into contact with the rolls, the alumina particles on the surface of metallic starting material come into contact with the rolls. At this time, the alumina particles increase the friction coefficient of the metallic starting material against the rolls, so that the metallic starting material becomes liable to be caught by the rolls.

EXAMPLE 1

Assuming the Mannesmann pipe making process, specimens to which various antioxidant agents had been applied were heated. Then, the surfaces of the heated specimens were examined.

[Examination Method]

A plurality of specimens of mark 1 to mark 4 given in Table 2 were prepared. Each of the specimens had a shape measuring 20 mm×20 mm×15 mm.

TABLE 2

| | | | | Specimen | | | |
|---|---|---|---|---|---|---|---|
| Mark | Steel type | Heating temperature (° C.) | Heating time (hr) | Antioxidant agent not applied | Antioxidant agent A1 applied | Antioxidant agent A2 applied | Remarks |
| 1 | S45C | 1230 | 2 | Scale produced | Scale produced | Scale not observed | — |
| 2 | 13Cr steel | 1230 | 2 | Scale produced | Scale produced | Scale not observed | — |
| 3 | SUS304 | 1230 | 2 | Scale produced | Scale produced | Scale produced | Scale production amount is the smallest for A2 |
| 4 | UNS S39274 | 1270 | 2 | Scale produced | Scale produced | Scale not observed | — |

Referring to Table 2, the mark 1 specimen consisted of a carbon steel having a chemical composition corresponding to S45C in JIS Standard. The mark 2 specimen consisted of a ferritic stainless steel containing 13% of Cr. The mark 3 specimen consisted of an austenitic stainless steel having a chemical composition corresponding to SUS304 in JIS Standard. The mark 4 specimen consisted of a two-phase stainless steel having a chemical composition corresponding to UNS 539274 in ATM Standard.

Further, the antioxidant agents given in Table 3 were prepared.

TABLE 3

| Component | Content (unit: weight part with respect to 100 weight parts of high-temperature glass frits) | |
| --- | --- | --- |
| | Antioxidant agent A1 | Antioxidant agent A2 |
| High-temperature glass frits HT1 | 100 | — |
| High-temperature glass frits HT2 | — | 100 |
| Medium-temperature glass frits LT1 | 7.7 | — |
| Medium-temperature glass frits LT2 | — | 8.2 |
| Boric acid | 0 | 8.2 |
| Clay | 15.1 | 15.8 |
| Alumina | 0 | 0 |
| Organic binder | 0 | 1.0 |
| Water | 104.8 | 121.9 |

Referring to Table 3, an antioxidant agent A2 was one example of the antioxidant agent according to this embodiment. The antioxidant agent A2 contained the high-temperature glass frits HT2 and medium-temperature glass frits LT2 given in Table 1. The viscosity at 1200° C. of the high-temperature glass frits HT2 was $2 \times 10^2$ to $10^6$ dPa·s. The viscosity at 700° C. of the medium-temperature glass frits LT2 was $2 \times 10^2$ to $10^6$ dPa·s. The antioxidant agent A2 further contained boric acid as the low-temperature inorganic compound. The content (weight part) of each component with respect to 100 weight parts of the high-temperature glass frits HT2 of the antioxidant agent A2 was as given in Table 3.

An antioxidant agent A1 contained the high-temperature glass frits HT1 and medium-temperature glass frits LT1. The viscosity at 1200° C. of the high-temperature glass frits HT1 was in the range of $2 \times 10^2$ to $10^6$ dPa·s. The viscosity at 700° C. of the medium-temperature glass frits LT1 was in the range of $2 \times 10^2$ to $10^6$ dPa·s. However, the antioxidant agent A1 did not contain the low-temperature inorganic compound. The content (weight part) of any other component with respect to 100 weight parts of the high-temperature glass frits HT1 of the antioxidant agent A1 was as given in Table 3.

Three specimens of each mark were prepared. To one of the three specimens, the antioxidant agent was not applied. To another specimen, the antioxidant agent A1 was applied, and to the remaining one specimen, the antioxidant agent A2 was applied.

Each of three specimens of each mark was charged into the heating furnace, and was heated at the heating temperature for the heating time given in Table 2. That is, the specimens were heated at temperatures not lower than 1200° C. The atmosphere in the furnace at this time contained 2 mass % of oxygen, 10 mass % of carbon dioxide, and 20 mass % of water, the balance being nitrogen. After heating, the specimen was taken out of the heating furnace, and the cross section of specimen was observed. Thereby, it was judged whether or not scale had been produced on the surface of specimen.
[Examination Results]

Figure 4:
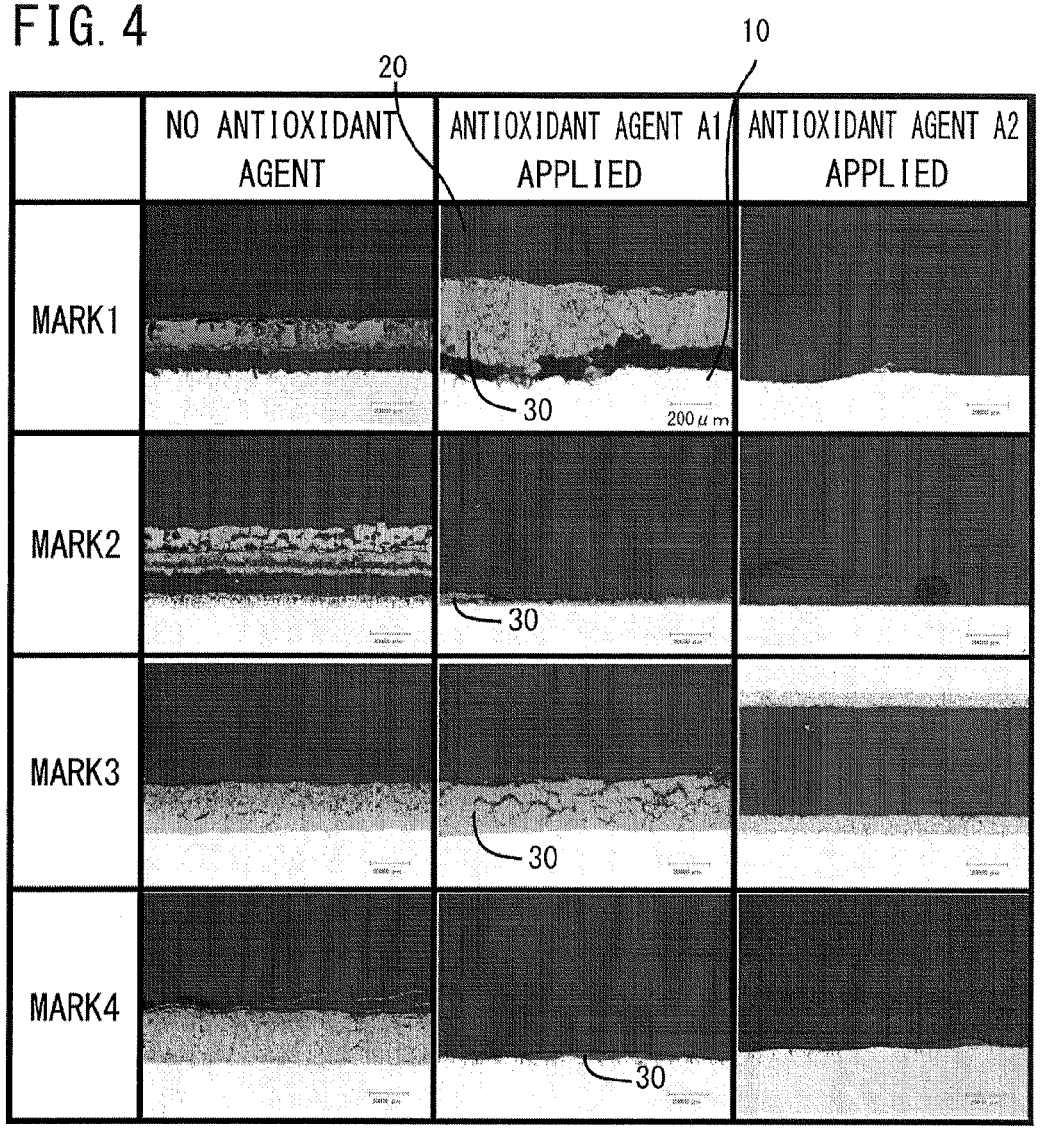
FIG. 4 is a chart showing cross-sectional images of specimens in Example 1.

The examination results are given in Table 2. Also, the cross-sectional photograph images (hereinafter, referred to as the cross-sectional images) of the specimens are shown in FIG. 4. In the rows in FIG. 4, the cross-sectional images of the specimens of marks 1 to 4 are arranged, and in the columns in FIG. 4, the cross-sectional images of the specimens to which the antioxidant agent is not applied, the cross-sectional images of the specimens to which the antioxidant agent A1 is applied, and the cross-sectional images of the specimens to which the antioxidant agent A2 is applied are arranged. In each of the cross-sectional images in FIG. 4, a white region in the lower portion is a specimen 10, and a black region in the upper portion is a resin 20 for macro observation. A gray region 30 sandwiched between the white region 10 and the black region 20 is scale produced on the specimen.

Referring to Table 2 and FIG. 4, in marks 1 to 4, the specimens to which the antioxidant agent A2 was applied had the smallest amount of scale. Specifically, on the specimens to which the antioxidant agent was not applied and the specimens to which the antioxidant agent A1 was applied, in all of marks 1 to 4, scale was produced. On the other hand, on the specimens to which the antioxidant agent A2 was applied, in marks 1, 2 and 4, scale was not observed. In mark 3, on the specimen to which the antioxidant agent A2 was applied as well, scale was produced. However, compared with other specimens (the specimen to which the antioxidant agent was not applied, the specimen to which the antioxidant agent A1 was applied) in mark 3, the production amount of scale was the smallest on the specimen to which the antioxidant agent A2 was applied.

EXAMPLE 2

Assuming the Ugine pipe making process, specimens to which various antioxidant agents had been applied were heated. Then, the surfaces of the heated specimens were examined.
[Examination Method]

Two round billets each consisting of a two-phase stainless steel were prepared. The two-phase stainless steel had a chemical composition corresponding to UNS S39274 in ATM Standard.

On one of the round billets, the antioxidant agent A1 was applied to the whole surface. On the other round billet, the antioxidant agent A2 was applied to the whole surface. The round billets to which the antioxidant agents have been applied were dried with warm air.

After drying, each of the round billets to which the antioxidant agent had been applied was charged into the heating furnace, and was heated at 1000° C. for 210 minutes. The atmosphere in the furnace at this time contained 2 mass % of oxygen, 10 mass % of carbon dioxide, and 20 mass % of water, the balance being nitrogen. The cross section in a portion close to the surface of the heated round billet was observed, and the presence of scale was examined.
[Examination Results]

Figure 5A:
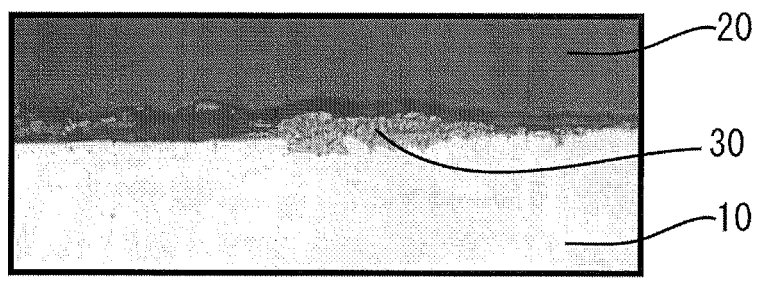
FIG. 5A is a photograph showing a cross-sectional image of a specimen to which an antioxidant agent is applied in Example 2.
Figure 5B:
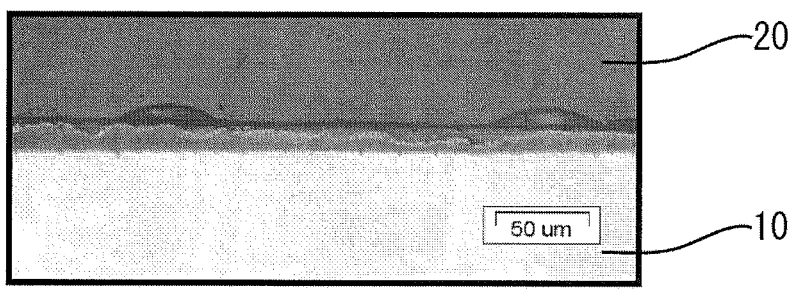
FIG. 5B is a photograph showing a cross-sectional image of a round billet to which an antioxidant agent different from that in FIG. 5A is applied.

FIGS. 5A and 5B show the cross-sectional images of the portions close to the surfaces of the heated round billets. FIG. 5A is the cross-sectional image of the round billet to which the antioxidant agent A1 has been applied, and FIG. 5B is the cross-sectional image of the round billet to which the antioxidant agent A2 has been applied. A white region in the lower portion of the cross-sectional image is the specimen (round billet) 10, and a black region in the upper portion thereof is the resin 20 for macro observation. A gray region seen in FIG. 5A is the scale 30.

Referring to FIGS. 5A and 5B, on the round billet to which the antioxidant agent A1 had been applied, the scale 30 was produced. On the other hand, on the round billet to which the antioxidant agent A2 had been applied, the scale was not observed.

EXAMPLE 3

The secular change of viscosity of the antioxidant agent in the case where the antioxidant agent contained an alkali metal salt was examined.

[Examination Method]

The above-described antioxidant agent A2 was prepared. The antioxidant agent A2 contained 47.8 wt % of water. Further, antioxidant agents A3 and A4 were prepared. The antioxidant agent A3 contained the same components as those of the antioxidant agent A2 and 1 wt % potassium carbonate aqueous solution. The content of the 1 wt % potassium carbonate aqueous solution in the antioxidant agent A3 was 2 weight percent.

The antioxidant agent A4 contained the same components as those of the antioxidant agent A2 and 1 wt % potassium carbonate aqueous solution. The content of the 1 wt % potassium carbonate aqueous solution in the antioxidant agent A4 was 4 weight percent.

The viscosities at the production time of the antioxidant agents A2 to A4 and the viscosities after forty days from production were measured at normal temperature. The viscosities of the antioxidant agents were measured by using a Zahn-viscosity cup based on ASTM D-1084.

[Examination Results]

Figure 6:
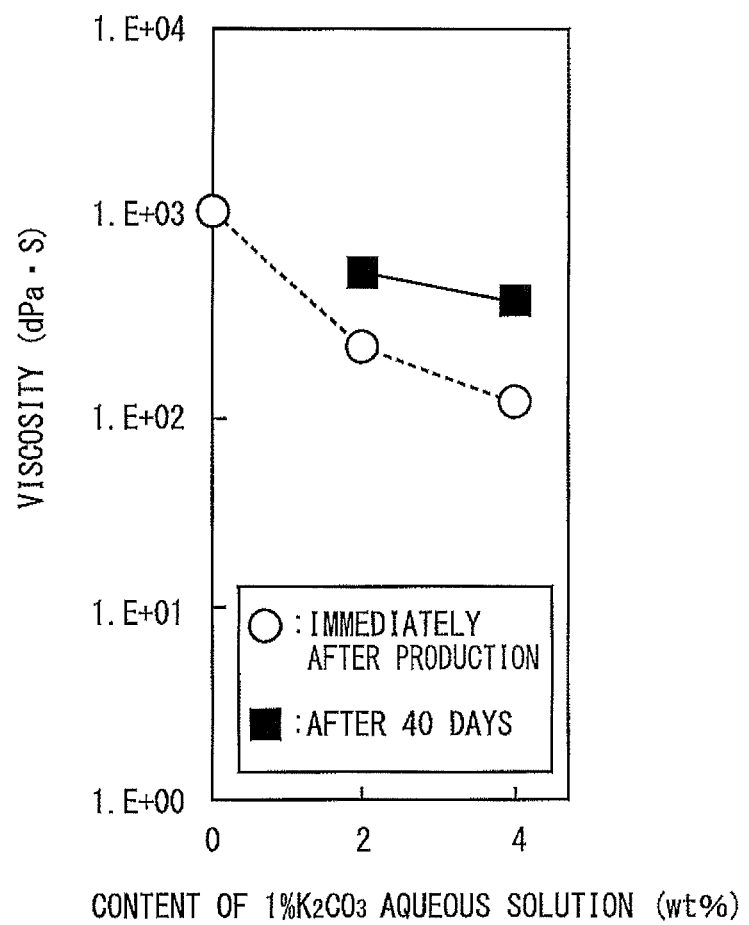
FIG. 6 is a diagram showing the relationship between the viscosity of a specimen and the content of potassium carbonate in an antioxidant agent in Example 3.

FIG. 6 shows the examination result. The abscissas of FIG. 6 represent the content of 1 wt % potassium carbonate aqueous solution, and the ordinates thereof represent the viscosity (dPa·s). The "○" mark in FIG. 6 indicates the viscosity at the production time, and the "■" mark indicates the viscosity at the time when forty days have elapsed.

Referring to FIG. 6, the viscosity at the production time of the antioxidant agent A2 in which the content of potassium carbonate was 0 weight percent was 1000 dPa·s. However, the antioxidant agent A2 at the time when forty days had elapsed set to gel, and the viscosity was unable to be measured.

On the other hand, for the antioxidant agent A3 in which the content of potassium carbonate was 2 weight percent and the antioxidant agent A4 in which the content of potassium carbonate was 4 weight percent, after forty days had been elapsed, the antioxidant agents did not set to gel unlike the antioxidant agent A2. The viscosities at the time when forty days had elapsed of the antioxidant agents A3 and A4 increased as compared with the viscosities at the production time. However, the secular changes of viscosities of the antioxidant agents A3 and A4 were restrained more than the antioxidant agent A2.

EXAMPLE 4

The secular change of viscosity of the antioxidant agent in the case where the antioxidant agent contained insoluble group 2 metal salt was examined.

[Examination Method]

An antioxidant agent A5 was prepared. Comparing with the antioxidant agent A2, the antioxidant agent A5 contained much water. Other components of the antioxidant agent A5 were the same as those of the antioxidant agent A2. Specifically, the antioxidant agent A5 contained 100 weight parts of high-temperature glass frits HT2, 8.2 weight parts of medium-temperature glass frits LT2, 8.2 weight parts of boric acid, 15.8 weight parts of clay, and 1.0 weight part of organic binder. The antioxidant agent A5 further contained 55 wt % of water.

Further, antioxidant agents A6 and A7 were prepared. The antioxidant agent A6 contained the same components as those of the antioxidant agent A5 and magnesium carbonate. The content of magnesium carbonate in the antioxidant agent A6 was 0.4 weight percent.

The antioxidant agent A7 contained the same components as those of the antioxidant agent A5 and magnesium carbonate. The content of magnesium carbonate in the antioxidant agent A6 was 1.0 weight percent.

The viscosities at normal temperature of the antioxidant agents A5 to A7 were measured with the elapse of time. The viscosities of the antioxidant agents were measured by using a Zahn-viscosity cup based on ASTM D-1084.

[Examination Results]

Figure 7:
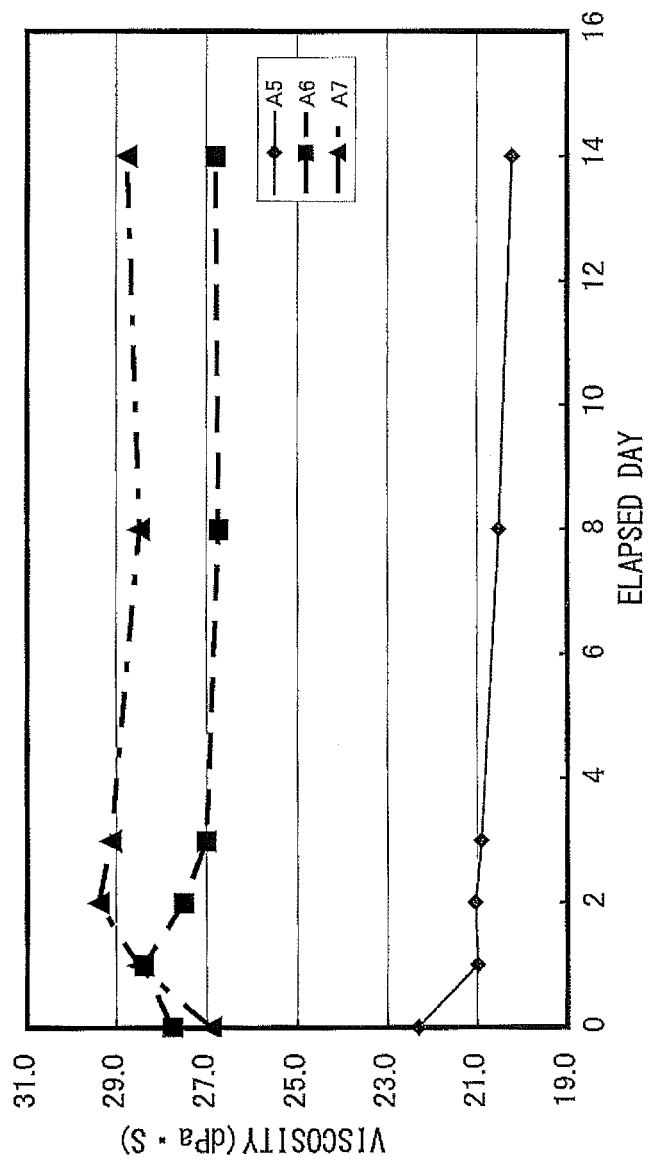
FIG. 7 is a diagram showing secular changes of viscosities of specimens in Example 4.

FIG. 7 shows the examination result. The abscissas of FIG. 7 represent the elapsed day (day), and the ordinates thereof represent the viscosity (dPa·s). The "♦" mark in FIG. 7 indicates the viscosity of the antioxidant agent A5. The "■" mark indicates the viscosity of the antioxidant agent A6. The "▲" mark indicates the viscosity of the antioxidant agent A7.

Referring to FIG. 7, the viscosity of the antioxidant agent A5 decreased gradually with the elapse of time from the time immediately after the production. The viscosities of the antioxidant agents A6 and A7 increased immediately after the production, but thereafter, were kept almost constant. That is, for the antioxidant agents A6 and A7, the decrease in viscosity was prevented.

The above is the explanation of an embodiment of the present invention. The above-described embodiment is merely an illustration for carrying out the present invention. Therefore, the present invention is not limited to the above-described embodiment, and the above-described embodiment can be carried out by being changed as appropriate without departing from the spirit and scope of the present invention.

Industrial Applicability

The antioxidant agent according to the present invention can be applied widely to a metallic starting material to be heated. In particular, it can be utilized for a metallic starting material to be heat-treated or a metallic starting material to be hot-worked.

The invention claimed is:

1. An antioxidant agent to be applied to the surface of a metallic starting material, containing:
   first glass frits having a viscosity of $2\times10^2$ to $10^6$ dPa·s at 1200° C.; and
   second glass frits having a viscosity of $2\times10^2$ to $10^6$ dPa·s at 700° C.; and
   an inorganic compound having a melting point not higher than 600° C.

2. The antioxidant agent according to claim 1, wherein the inorganic compound is at least one of an inorganic salt and an oxide, each having a melting point of 400 to 600° C.

3. The antioxidant agent according to claim 1, wherein the inorganic compound is at least one of boric acid and boron oxide.

4. The antioxidant agent according to claim 2, wherein the inorganic compound is at least one of boric acid and boron oxide.

5. The antioxidant agent according to claim 1, wherein the antioxidant agent contains 4 to 20 weight parts of the second glass frits and 4 to 20 weight parts of the inorganic compound with respect to 100 weight parts of the first glass frits.

6. The antioxidant agent according to claim 2, wherein the antioxidant agent contains 4 to 20 weight parts of the second glass frits and 4 to 20 weight parts of the inorganic compound with respect to 100 weight parts of the first glass frits.

7. The antioxidant agent according to claim 3, wherein the antioxidant agent contains 4 to 20 weight parts of the second glass frits and 4 to 20 weight parts of the inorganic compound with respect to 100 weight parts of the first glass frits.

8. The antioxidant agent according to claim 4, wherein the antioxidant agent contains 4 to 20 weight parts of the second glass frits and 4 to 20 weight parts of the inorganic compound with respect to 100 weight parts of the first glass frits.

9. The antioxidant agent according to claim 1, wherein the antioxidant agent further contains an alkali metal salt.

10. The antioxidant agent according to claim 1, wherein the antioxidant agent further contains an insoluble group 2 metal salt.

11. The antioxidant agent according to claim 10, wherein the insoluble group 2 metal salt is at least one of magnesium carbonate and calcium carbonate.

12. The antioxidant agent according to claim 1, wherein the antioxidant agent further contains a suspending agent.

13. A process for producing a metallic material, comprising the steps of:
   applying the antioxidant agent according to claim 1 to the surface of a metallic starting material; and
   heating the metallic starting material to which the antioxidant agent has been applied.

* * * * *